US009135598B2

(12) United States Patent
Ferraro

(10) Patent No.: US 9,135,598 B2
(45) Date of Patent: Sep. 15, 2015

(54) ANONYMOUS REPORTING SYSTEM

(75) Inventor: Eugene F. Ferraro, Morrison, CO (US)

(73) Assignee: Excel Communications, Golden, CO (US)

( * ) Notice: Subject to any disclaimer, the term of this patent is extended or adjusted under 35 U.S.C. 154(b) by 926 days.

(21) Appl. No.: 10/288,835

(22) Filed: Nov. 5, 2002

(65) Prior Publication Data

US 2003/0088645 A1     May 8, 2003

Related U.S. Application Data

(60) Provisional application No. 60/337,036, filed on Nov. 6, 2001.

(51) Int. Cl.
G06Q 10/00 (2012.01)
G06Q 10/10 (2012.01)

(52) U.S. Cl.
CPC .............. *G06Q 10/10* (2013.01); *G06Q 10/103* (2013.01)

(58) Field of Classification Search
CPC ... G06Q 50/22; G06Q 50/24; G06Q 30/0242; G06Q 30/0251; G06Q 30/0269; G06Q 30/0271; G06Q 30/0277; G06Q 40/08; G06Q 10/00; G06Q 10/103; G06Q 50/30; G06Q 10/10
USPC ..................................... 705/1, 10; 707/1, 100
See application file for complete search history.

(56) References Cited

U.S. PATENT DOCUMENTS 6,631,384 B1 * 10/2003 Richman et al. ........... 707/104.1

2001/0034708 A1    10/2001  Walker et al. .................. 705/51
2002/0116247 A1    8/2002   Tucker et al. ..................... 705/8
2006/0010047 A1 *  1/2006   Minor .............................. 705/30

FOREIGN PATENT DOCUMENTS

WO     WO 00/50983    *  8/2000   ................ G06F 3/14

OTHER PUBLICATIONS

Anderson Software, "TipSoft, Crime Stopper Tip Management Software", Feb. 18, 2001, http://web.archive.org/web/20010218005333/www.crimestop.com/features.htm.*

* cited by examiner

Primary Examiner — Calvin L Hewitt, II
Assistant Examiner — Margaret Neubig
(74) Attorney, Agent, or Firm — Brownstein Hyatt Farber Schreck, LLP

(57) ABSTRACT

An anonymous reporting system (10) is provided for use in reporting and following up on incidents, accidents and the like. The system (10) is initiated by a system provider (12) on behalf of an institutional participant/client (14) for access by any number of individual users (16). The most common implementation is a web based interface (24) including a web site (27). The interface (24) includes an anonymizer (38) for safeguarding the identity of each individual user (16). The system (10) permits the user (16) to enter a report (28) and then assigns a random number identifier (74) associated with the report (28). The report (28) is forwarded to selected recipients (22) and to one or more administrators (32) associated with the participant/client (14). The administrators (32) may request follow up comments or send messages (64) associated with the report (28) by the access number (74) so that the user (16) may continue dialog, all while remaining totally anonymous. The system (10) is especially adapted for use in school or large company situations.

10 Claims, 2 Drawing Sheets

ANONYMOUS REPORTING SYSTEM

This application claims priority from U.S. Provisional Application Ser. No. 60/337,036, filed Nov. 6, 2001.

TECHNICAL FIELD

The present invention relates generally to systems for handling and arranging information, and more particularly to information handling for receiving and categorizing anonymous reports in relationship to security and safety issues.

BACKGROUND ART

The reporting of "incidents" is often of great value in recognizing potential problems before the persons involved go further along the same paths, too often with tragic or unfortunate results. Early recognition of problem personalities or trends can provide opportunities for intervention and prevention of more serious activities. Incidents of all sorts occur frequently in social circumstances, such as in schools or the workplace, where stress can lead to escalation, and escalation can lead to violence. The problems relate to groups which include three of the largest segments of the population; children attending school from age five through eighteen, students attending secondary school and those employed. The latest U.S. census estimates that 73 million Americans are in school and 134 million are in the workplace. Those in charge of security and the well being of the persons in these situations often have a "need to know" about incidents which might seem minor, but can be the harbinger of events of greater consequence.

Difficulties occur in the handling of report and in encouraging observers to make the incidents known to those in authority, however. These difficulties arise in areas of collating and correlating the incidents and in maintaining secrecy and the privacy of the persons involved, whether they are the perpetrators or the witnesses. There is frequently a fear factor involved among witnesses, as well as a general reluctance to get involved or to be seen as a "snitch" or troublemaker. Overcoming obstacles to reporting incidents, and providing a structure for discrete and efficient handling of reports is accordingly a matter for concern.

A major concern in modern society deals with these incidents, especially in light of trends of violence in the workplace and educational institutions. Today, violence, including sexual assault and harassment, is so prevalent in the workplace that, in many organizations it has become an accepted fact of life.

The National Center for Victims of Crime reported 709 homicides in the workplace during 1998 and 13 million workers say they are concerned about the behavior of a coworker they think could become violent. Twenty-five percent of workers said their company offered training on workplace violence, sixty-five percent said theirs did not, and nine percent said they did not know if work had offered any training or help. Nine percent of workers reported an assault or other violent act in their workplace in the past year, and eighteen percent reported a threat or verbal intimidation, three out of every four say they are getting no guidance on how to prevent violence or how to recognize the dangers of violence [National Center for Victims of Crime, 1999].

These astounding figures suggest that more than 12 million acts of violence and 24 million threats or verbal intimidations occur each year [US Department of Education and Justice, 1998]. Only 25 percent of the companies surveyed have begun, in some way to address violence at work [Business Controls, Inc., *What Every Employer Should Know About Workplace Violence*, 2000]. While many companies have begun to recognize the need to address the potential for violence, it is evident that they are looking for a starting point. The inventor, Eugene F. Ferraro, CPP, CFE, is a pioneer in developing methods to address violence in the workplace. Over the last ten years Mr. Ferraro has developed the training programs and protocols to recognize and address the potential for violence in the workplace. Almost as an after thought others within the Security Industry saw the opportunity to establish anonymous employee "hotlines". Most of them were established without thought as to who might use them and how they would be used. Mr. Ferraro took a step back, analyzed the effectiveness of what have come to be labeled "snitch lines" and developed a new concept and a new standard. After years of research he developed an anonymous incident reporting service that is easy to use, reliable and completely confidential.

The threat to students and young people is not new. Throughout 1997, students age 12 through 18 were victims of about 202,000 serious violent crimes at school (i.e. rape, sexual assault, robbery, and aggravated assault). This same group was also victimized by 898,000 less violent crimes at school. While the data reported for 1998 by 481 four-year colleges and universities indicate that 1,240 forcible sex offenses, 159 non-forcible sex offenses, 1,068 robberies, 2,267 aggravated assaults, 13,745 burglaries, 4,160 motor vehicle thefts, 539 arsons, 170 hate crimes, one manslaughter, and 20 murder incidents occurred on campuses with more than 5,000 students [Chronicle of Higher Education, 2000].

The problem for students attending primary schools could even be greater:
1. In 1996, students K-12 were the victims of approximately 3 million thefts or violent crimes at school.
2. Every hour, more than 2000 students and 40 teachers are attacked while on school property.
3. On any given school day in this country an estimated 200,000 students carry a gun to school.
4. Over 200,000 students don't go to school every school day because of fear of being bullied [U.S. Department of Education and Justice, Annual Report on School Safety, 1998].

The study and research by Dr. Kelly Zinna reveals:
1. School children of all ages have clear concerns about their safety at school.
2. In almost every case of schoolplace violence, someone knew of the threat before violence erupted.
3. School children and college students are not afraid to become involved and report threats if they can remain anonymous.
4. Schoolplace anonymous incident reporting systems are an essential component to any meaningful schoolplace safety program [K. Zinna, *After Columbine*, Spectra Publishing, 1999 and Excel Communications 2000].

As such, the need for services relating to incident reporting and correlation could not be greater. Everyone is at risk and no one feels safe. Unfortunately however, educators, teachers and employers have responded by calling for more guards, locks and cameras. It is only a matter of time until the value of anonymous incident reporting systems will be fully recognized.

In light of the great need for finding ways to obtain and correlate information on preliminary incidents, as a tool for preventing violence and harassment, and the general lack of success in overcoming these by mere security presence alone, there exists an opportunity to refine and improve the methods.

In particular, methods for encouraging greater participation in reporting, and creating a greater degree of witness confidence and safety is needed.

SUMMARY OF THE INVENTION

Accordingly, it is an object of the present invention to provide an always available (24/7) system for reporting incidents of significance to particularly designated recipients.

Another object of the invention is to provide a system adapted for specified use, such as school or workplace safety and to provide simple to use and anonymous means persons to report and provide information on events and incidents relevant to that use.

Still another object of the invention is to provide input means which are comfortable for the user, allowing the user to provide input without fear of reprisals or of greater involvement than desired, or even to remain completely anonymous, if desired.

Briefly, a preferred embodiment of the present invention is a method of providing people with an anonymous means to report incidents of concern and to communicate when desired. Further once incidents are reported the system provides a structure for correlating and using the previous reports. In addition, when a "witness" or User is established in the system, the structure is provided to augment previous reports, add new submissions and, to a limited degree, observe the results of previous submissions. The delivery of that service is made both by telephone and the Internet.

In operation of the system, a subscriber, the institution desiring use of the system for security purposes, arranges for establishment of an incident reporting system by the system provider. The subscriber publicizes the existence of the reporting system to its constituency and publishes the methods by which the constituents may report incidents, typically including telephone numbers and Internet contact addresses. The subscriber then requests that the incidents be reported using the system in, if desired, a fully anonymous manner. The provider then receives and collates the information and provides reports to the subscriber.

A significant aspect of they system is an "anonymizer" which insures the confidentiality of both the reporting person and the content of the report, within limitations. The anonymizer allows the reporting person (witness/User) to establish one or more anonymous accounts under which reports, and follow ups of reports may be made. These accounts may also function as personas allowing queries and other communications relating to following up.

The same overall system allows communications by witnesses, subscribers and system providers, each with separate access capabilities and output options, and provides an interface structure and overall framework leading to organized and safe handling of the information and identities of the participants.

An advantage of the present invention is that it utilizes communication technologies which are easy to use and are stable.

Another advantage of the present invention is that it uses the telephone and the Internet to allow users to communicate anonymously and safely.

A further advantage of the invention is that it maintains complete confidentiality of those reporting incidents by utilizing techniques for generating unique anonymous tags for use by individuals.

Still another advantage of the invention is that it categorizes information and provides reporting to subscribers in an inexpensive and useful form.

A still further advantage of the invention is that users are permitted to provide follow up information on an incident and to tie such information in with previous reports.

Yet another advantage of the invention is the anonymous nature of the reports may be publicized within the constituencies, thus increasing confidence in the confidentiality and encouraging participation.

These and other objects and advantages of the present invention will become clear to those skilled in the art in view of the description of the best presently known mode of carrying out the invention and the industrial applicability of the preferred embodiment as described herein and as illustrated in the several figures of the drawings.

BEST MODE FOR CARRYING OUT THE INVENTION

Figure 1A:
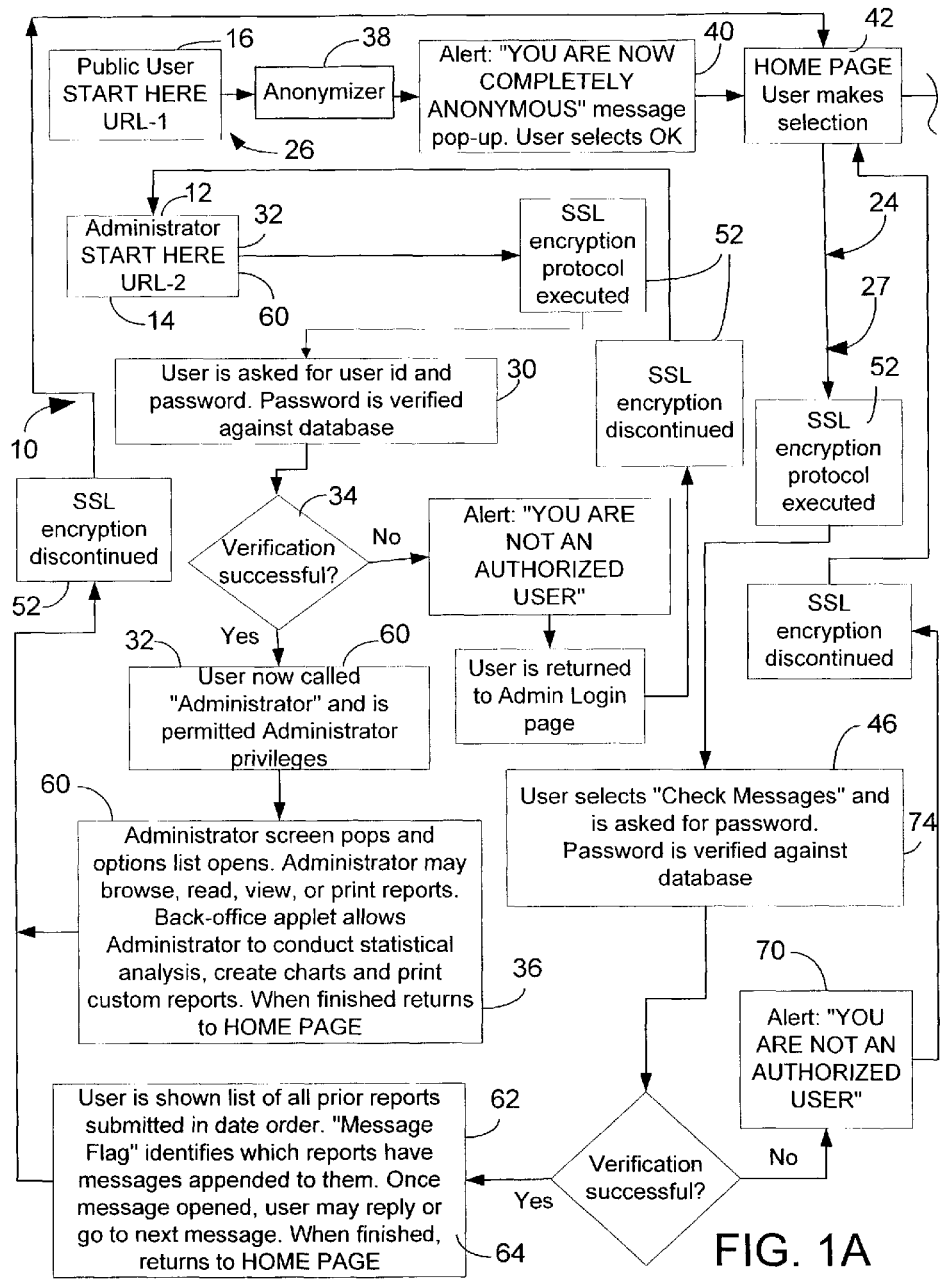
FIG. 1 (including FIGS. 1A and 1B) is a schematic illustration showing the operation of the system in a flow chart style.

The present invention is an anonymous incident reporting and communications system 10 for schools, businesses, public institutions and governmental agencies. The system 10 involves services coordinated by a system provider 12 and utilized by a variety of institutional participants 14 and individual constituent users 16. The system 10 allows participants 16 to anonymously and easily report threats of violence, harassment, sexual misconduct, discrimination, dishonesty or other concerns in a timely and safe manner via telephone 18 or the Internet 20. Its services enable participants 14 to anonymously generate confidential reports and instantly transmit them to a pre-designated recipient 22 in the subscriber organization or institution and to anyone else of the participant's choosing. The interface 24 is simple, intuitive and user-friendly. The experience is efficient, rewarding and safe.

In addition to incident reporting, users ("User(s)") 16 can also report workplace accidents, pass along suggestions and obtain safety information.

Figure 1B:
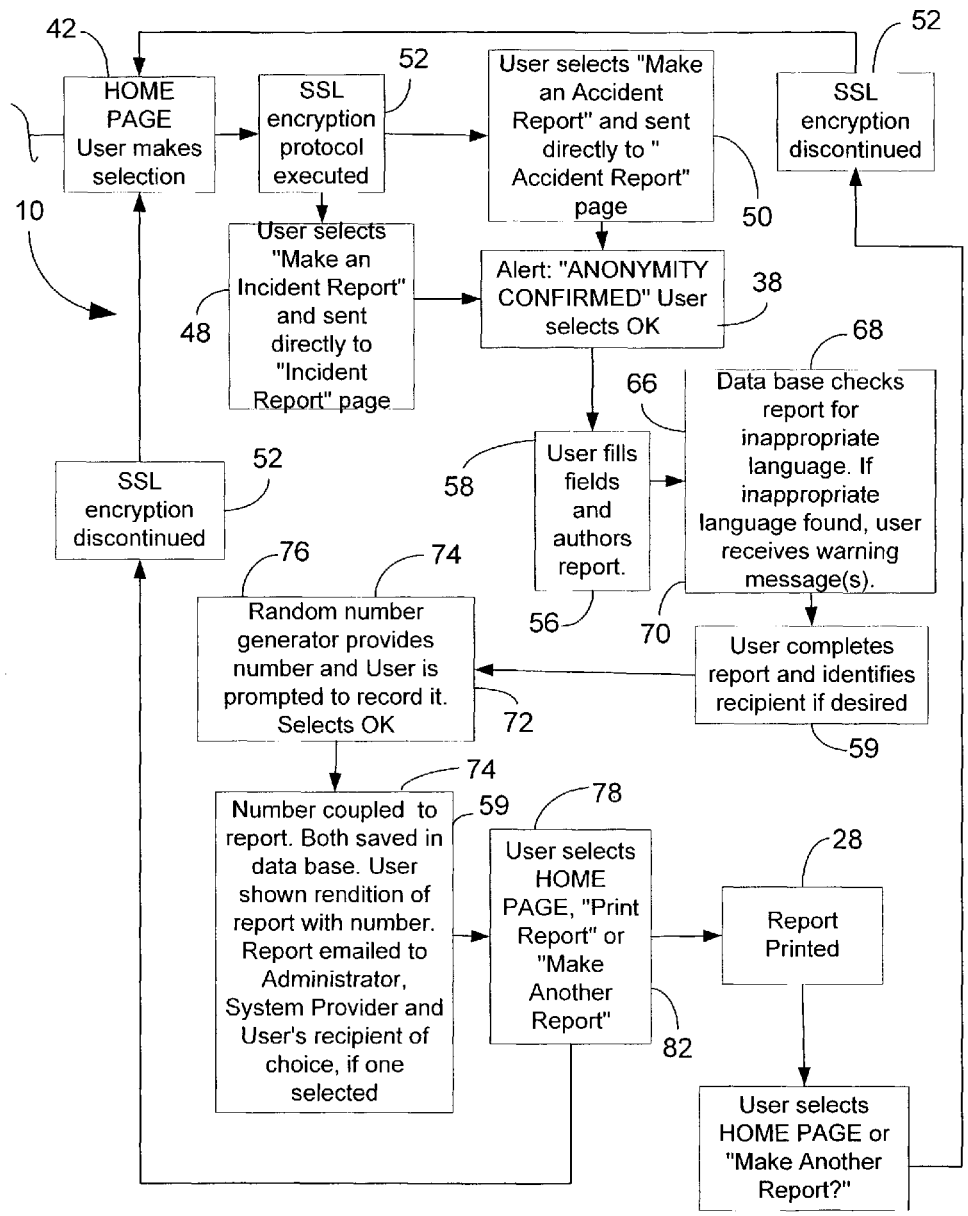

The general operation of the system 10 is shown in a flow chart manner in the illustration of FIG. 1 (shown as divided into FIGS. 1A and 1B for presentation purposes. This illustration shows the operation of the system 10 in response to an access request 26 by any user 14. The access request may be direct, as in an online electronic access, or indirect, where a telephone report is provided and then, either concurrently or subsequently entered into the system 10 by personnel of the system provider 12. The interface 24 with the system 10, whether directly or delayed (as in the case of telephone communication, is through the web site 27 which is provided by the System Provider 12. One of more web sites 27 may be provided, with each being customized to the requirements of the particular institutional participant(s) 14.

As is illustrated in the flow chart, upon submission of a report 28 (regardless of type), Users 16 are immediately issued a confidential access number (password) 30. The access number 30 allows the User 16 to anonymously follow up on his or her report 28 at a later date, and provide additional information or assist further if necessary. Services, whether accessed via telephone 18 or the Internet 20 are available to Users 16 at any time of day or night, seven days a week.

The most complex aspect of the service is the feature-rich Internet and Web site component 27. FIG. 1 illustrates in some detail how the user interfaces 24 with the Web site 27 through the Internet 20 and how the information provided is managed and disseminated. The process is engineered to allow anonymous and encrypted communications between the User 16 and a pre-assigned administrator ("the Administrator") 32. The Administrator 32 will typically be associated with the system provider 12 and may administer the service for a variety of separately maintained services for institutional participants 14. The User 16 is permitted to create, edit and print reports 28, as well as respond to inquiries 34 posted by the Administrator 32. The Administrator 32 may browse, read, view and print those reports 28. A back-office application 36 allows the Administrator 32 to use reports 28 to conduct statistical analysis, create charts and print custom reports.

The system 10 of the present invention involves numerous unique features, one of the most significant of which is the "anonymizer" 38. The anonymizer 38 operates as follows: Upon entering the site 27, the User 16 is immediately anonymized. All identifying information is rendered unintelligible and is immediately purged when the User leaves the site. The pop-up message "YOU ARE NOW COMPLETELY ANONYMOUS" 40 appears as soon as the User accesses a HOME PAGE 42 opening, which is the entry to the web site 27 and the system 10. The User 16 clicks it away by clicking "OK." The User 16 will remain anonymous until he leaves the site. Upon anonymization, a small icon 44 (shield with the letter "A" in it) will appear in the browser tool tray of the User. The icon 44 will remain visible as long as the anonymization is in effect.

From the HOME PAGE 42, the User 16 makes a choice by selecting "Check Messages" 46, "Make an Incident Report" 48 or "Make an Accident Report" 50. In each case an SSL (Secure Socket Layer) encryption protocol 52 is executed. The User 16 will be alerted to such by a message window and the appearance of a small padlock icon 54 appearing in the tool tray of their browser. Double-clicking this icon 54 will reveal the digital certificate assigned, confirming encryption. SSL encryption services will be provided for the site by a commerce vendor, such as Verisign.

Regardless of the nature of the report indicated, which will depend entirely on the situation, report data 56 of indefinite length may then be entered. The system 10 provides a word processor data entry screen 58 which allows the User 16 to enter and edit, in a report form 59, whatever sort of information is desired. The word processor screen 58 remains open until the User 16 has determined that the data entry is complete and clicks it closed. Any information or report provided by the User 16 while SSL is enabled will be encrypted until notified otherwise. When the User 16 leaves a secured portion of the site, encryption will conclude and the padlock icon 54 will disappear from the tool bar.

Administrative rights will be granted to designated client participants (usually security personnel associated with the subscriber participants 14). These participants will be a part of the group called Administrators 32. Administrators 32 will be provided an "Access Code" and password 30. Upon verification against a database, Administrators 32 may view reports created by their associated Users (e.g. their employees or students).

Reports 28 created by Users 16 will be stored in a relational database (see below for how reports are created). Administrators 32 may browse, read, view and print reports 28. The back-office application 36 allows them to conduct statistical analysis, create charts and print custom reports for their own purposes.

A Web Master 60, who will typically be a person associated with and controlled by the system provider 12 will have rights to perform any Administrator function, assign passwords and access codes, as well as post messages in response to User reports. Only the Web Master 60, a designated Administrator 32 and the report's author (the specific User 16 who generated the particular report 28) will be permitted to view prior reports and Web Master postings.

A "message flag" 62 will identify reports 28 within the database with messages 64 posted by the Web Master 60. The object is to allow the User and the Web Master to have electronic dialogue (much like email) where both remain anonymous. When the User 16 next logs on they will be able to select the "Check Messages" 46 box on the HOMEPAGE 42 and will have an opportunity to review and reply to the messages 64 from the Web Master 60.

An optional feature, depending on the desires of the subscriber participant 14, relates to a method for filtering "offensive language" as defined for the particular purpose. In this feature, known as an offensive language filter 66 a spell-check module 68 will detect offensive words if used by the User 16 while completing the form and filling fields in the report form 59. The User 16 will be warned of such and the offending language will be X'ed out, but not deleted. A warning message box 70 will pop up, warning the User 16 not to use offensive language again. A database will be used to spell-check and identify offensive language for this purpose. It is recognized that this feature will need to permit the use of such language in quoting the details of incidents and the like, and will be flexible to allow limited usage of the forbidden terms, in the proper context.

At the end of the form 59, the User 16 is offered the opportunity to email the report to anyone of his choice. Regardless of the choice, the report 28 will also be distributed to predetermined designated recipients identified by the client/subscriber 14.

The User 16 is then prompted to press a "Get Access Number" button 72 in order to obtain a user and report specific access number 74. In doing so, a random number generating method 76 produces a unique nine-digit access number which becomes the User access number 74 associated with the report 28. The User 16 is instructed to manually record this. Simultaneously, the user access number 74 is coupled to the report 28 and saved in a database. The User 16 is prompted to submit the report 28 and in doing so, is shown an non-editable rendition of the report and reminded again of his/her user access number 74. The User 16 is then provided the option to "Submit Report" or "Redo" 78. Selection of "Redo" restarts the process.

Submission of the report 28 immediately results in the system 10 emailing the report to the Web Master 60 and any designated recipient 22 (selected system provider managers or report reviewers). The report 28 is also bounced against a "Fuzzy Database" 80 in an effort to identify the client Administrator or client-designated recipient. Because the Web Site 27 is open and entry is not password protected, anyone with Internet access can enter the site and create/submit a report 28. As such, the User 16 cannot be provided pull-down lists to identify and select her/his employer or school because of confidentiality concerns. Additionally, any typographical error or misspelling on the part of the User 16 may make the identity of the corresponding client 14 impossible to determine electronically. The "Fuzzy Database" 80 containing permutations of the names of subscriber clients 14 will be used to link the User's report 28 to the proper client 14. Once linkage is accomplished, the report 28 will be emailed to the pre-designated client recipient 22. If no match is found the report 28 is forwarded to a default Administrator 32 who determines future handling.

The user access number 74 created in the process will allow the Web Master 60 to post messages 64 to a desired report 28'. In turn, Users may later return to the site and retrieve those messages 64 by identifying himself/herself only with the user access number 74. Upon re-entry to the site 27, a User 16 retrieving messages may append an existing report 28' or create a new one 28". A new report 28" will generate a new user access number 74'.

Upon leaving the site the User will offered the option of placing an "Auto-shortcut" 82 to the site 27 on her/his desktop and/or in his/her tool tray. Corporate subscriber clients 14 will be provided a small shortcut application 84 which they can install or download onto all corporate workstations, which will place the "Auto-shortcut" 82 on the desktop and/or in the tool tray.

In addition to the above mentioned examples, various other modifications and alterations of the anonymous incident reporting system 10 may be made without departing from the invention. Accordingly, the above disclosure is not to be considered as limiting and the appended claims are to be interpreted as encompassing the entire spirit and scope of the invention.

INDUSTRIAL APPLICABILITY

As described above, the present invention is utilized in the context of safety, security and personnel management applications, particularly in schools and the workplace. The system 10 is adapted to be accessible to any interested party with access to provided telephone 18 numbers or web sites 27. Potential subscriber clients 14 will typically be institutions, either academic or corporate with concerns about controlling incidents which may presage more serious future conduct.

The operation of the system 10 is as shown in the drawing and described above.

For the above, and other, reasons, it is expected that the anonymous reporting system 10 of the present invention will have widespread industrial applicability. Therefore, it is expected that the commercial utility of the present invention will be extensive and long lasting.

I claim:

1. In a computing system with a web site operating on a computer, a computer-implemented method for facilitating anonymous reporting of events and incidents comprising:
   assigning, by a computer, an access code and password to a group of administrators that includes a group of client participants;
   saving, by the computer, the access code and password;
   receiving, at a web-based interface, content;
   generating, by the computer, a report using the content;
   storing the report in a first relational database;
   assigning, by the computer, a random number identifier to the report;
   purging, by the computer, the content from the first relational database;
   storing, by the computer, the report and the random number identifier in a second relational database;
   routing, by the computer, the report to a computer of a designated subscriber client of the group of client participants using a fuzzy algorithm;
   receiving, by the computer, a request for the report, the request including the random number identifier; and
   sending the report, using the computer, in response to the request.

2. The method of claim 1, further comprising, receiving a user selection of a recipient to receive the report.

3. The method of claim 1, wherein the random number identifier is unique to the report.

4. The method of claim 1, wherein the fuzzy algorithm is configured to route the report using portions of the content having typographical errors.

5. The method of claim 1, further comprising receiving, at the web-based interface, a selection of a type of report.

6. A computer-implemented method comprising:
   assigning, by a computer, an access code and password to a group of administrators that includes a group of client participants;
   saving, by the computer, the access code and password;
   receiving, at a web-based interface, content;
   generating, by the computer, a report using the content;
   storing the report in a first relational database;
   assigning, by the computer, a random number identifier to the report;
   purging, by the computer, the content from the first relational database;
   storing, by the computer, the report and the random number identifier in a second relational database;
   routing, by the computer, the report to a computer of a designated subscriber client of the group of client participants using a fuzzy algorithm;
   receiving, by the computer, a request for the report, the request including the access code and password; and
   sending, by the computer, the report in response to the request.

7. The method of claim 6, further comprising, receiving, at the web-based interface, a selection of a type of report.

8. The method of claim 6, wherein the random number identifier is unique to the report.

9. The method of claim 6, wherein the fuzzy algorithm is configured to route the report using portions of the content having typographical errors.

10. The method of claim 6, further comprising receiving, at the web-based interface, a selection of a type of report.

* * * * *